(12) United States Patent
Jansen et al.

(10) Patent No.: US 10,259,049 B2
(45) Date of Patent: Apr. 16, 2019

(54) TOOL HOLDER HAVING A COLLET HOLDER AND A TOOL INSERT FOR USE IN A TOOL HOLDER

(71) Applicant: WTO WERKZEUG-EINRICHTUNGEN GMBH, Ohlsbach (DE)

(72) Inventors: Karlheinz Jansen, Schutterwald (DE); Klaus Maier, Offenburg (DE); Sascha Tschiggfrei, Gengenbach (DE)

(73) Assignee: WTO WERKZEUG-ENRICHTUNGEN GMBH, Ohlsbach (DE)

( * ) Notice: Subject to any disclaimer, the term of this patent is extended or adjusted under 35 U.S.C. 154(b) by 105 days.

(21) Appl. No.: 15/144,464

(22) Filed: May 2, 2016

(65) Prior Publication Data

US 2016/0339527 A1 Nov. 24, 2016

Related U.S. Application Data

(63) Continuation of application No. 12/978,379, filed on Dec. 23, 2010, now abandoned.

(30) Foreign Application Priority Data

Dec. 28, 2009 (DE) ........................ 10 2009 060 678

(51) Int. Cl.
  *B23B 31/10* (2006.01)
  *B23B 31/20* (2006.01)
  *B23B 31/11* (2006.01)
(52) U.S. Cl.
  CPC ........ *B23B 31/201* (2013.01); *B23B 31/1107* (2013.01); *B23B 31/1122* (2013.01);
  (Continued)

(58) Field of Classification Search
  CPC ................ B23B 2231/0288; B23B 2231/0292
  (Continued)

(56) References Cited

U.S. PATENT DOCUMENTS 1,578,311 A * 3/1926 Grosset .................. B23B 31/02
                                                       279/91
2,511,416 A   6/1950 Rundorff
(Continued)

FOREIGN PATENT DOCUMENTS

CN       1115566 A    1/1996
DE       3715659      9/1988
(Continued)

OTHER PUBLICATIONS

Office Action from the Chinese Patent and Trademark Office for Application No. 201010604285.1 dated Dec. 24, 2013 with English translation (18 pages).
(Continued)

*Primary Examiner* — Daniel Howell
*Assistant Examiner* — Paul M Janeski
(74) *Attorney, Agent, or Firm* — Michael Best & Friedrich LLP

(57) ABSTRACT

A system is proposed that is made up of a tool holder 1, a collet 15 with a clamping nut 19, and a tool insert 27, in which the collet 15 and the tool insert are fixed and positioned on various function surfaces within the tool holder 1. Nevertheless, the clamping means are the same, namely a thread on the tool holder 1.

28 Claims, 11 Drawing Sheets

(52) U.S. Cl.
CPC ... *B23B 2231/04* (2013.01); *B23B 2231/2008* (2013.01); *B23B 2265/32* (2013.01); *Y10T 279/17504* (2015.01); *Y10T 409/30952* (2015.01)

(58) Field of Classification Search
USPC ....... 279/45, 51, 48, 52, 133, 46.3, 56, 46.4, 279/46.6; 409/234, 232, 233; 408/239 R, 408/240, 29 A
See application file for complete search history.

(56) References Cited

U.S. PATENT DOCUMENTS

| | | | |
|---|---|---|---|
| 2,573,325 A | 10/1951 | Fowlie | |
| 2,579,082 A | 12/1951 | Kramer | |
| 2,580,067 A | 12/1951 | Barnes | |
| 2,711,904 A | 6/1955 | Gartner et al. | |
| 2,719,722 A * | 10/1955 | Nickless | B23B 31/113 279/103 |
| 3,035,845 A | 5/1962 | Benjamin | |
| 3,120,961 A | 2/1964 | Frank | |
| 3,195,909 A | 7/1965 | Winnen | |
| 3,395,927 A | 8/1968 | Hammond | |
| 3,425,704 A | 2/1969 | Dickson | |
| 3,425,705 A | 2/1969 | Benjamin et al. | |
| 3,625,100 A | 12/1971 | Barnard | |
| 3,672,256 A | 6/1972 | Kosmowski | |
| 3,719,367 A | 3/1973 | Baturka | |
| 3,762,731 A | 10/1973 | Matsumoto | |
| 3,811,694 A | 5/1974 | Dahlman et al. | |
| 4,266,895 A | 5/1981 | Lewis | |
| 4,813,831 A | 3/1989 | Reinauer | |
| 4,902,177 A * | 2/1990 | Burnett | B23B 31/1173 279/18 |
| 5,407,308 A | 4/1995 | Takayoshi | |
| 5,522,605 A | 6/1996 | Lewis et al. | |
| 5,775,857 A | 7/1998 | Johne | |
| 5,957,467 A | 9/1999 | Hornung | |
| 6,179,303 B1 | 1/2001 | Jansen | |
| 7,168,900 B2 | 1/2007 | Neumeier | |
| 8,342,539 B2 | 1/2013 | Guy | |
| 2004/0124592 A1 | 7/2004 | Neumeier | |
| 2004/0164502 A1 | 8/2004 | Taguchi et al. | |
| 2006/0127194 A1 | 6/2006 | Schafer | |
| 2007/0246900 A1 | 10/2007 | Oshnock et al. | |
| 2009/0116912 A1 | 5/2009 | Jansen et al. | |

FOREIGN PATENT DOCUMENTS

| | | |
|---|---|---|
| DE | 10219600 | 11/2003 |
| JP | S51-105670 U | 8/1976 |
| JP | H05-169303 | 7/1993 |
| JP | H08-503170 | 4/1996 |
| JP | 2000-246521 | 9/2000 |
| JP | 2005-535466 | 11/2005 |
| JP | 2007-038362 | 2/2007 |
| WO | 2006024259 A1 | 3/2006 |

OTHER PUBLICATIONS

Office Action from the German Patent and Trademark Office dated Jul. 19, 2010 (English Translation provided).
Office Action from the Japanese Patent and Trademark Office for Application No. P2010-253856 dated Sep. 23, 2013 (5 pages).
Indian Patent Office Action for Application No. 2749/DEL/2010 dated Feb. 19, 2018 (5 pages).

* cited by examiner

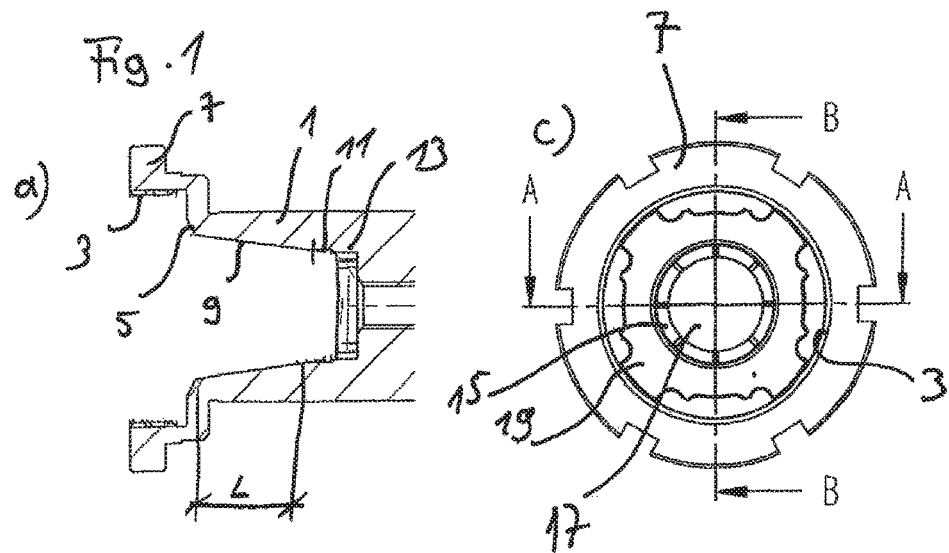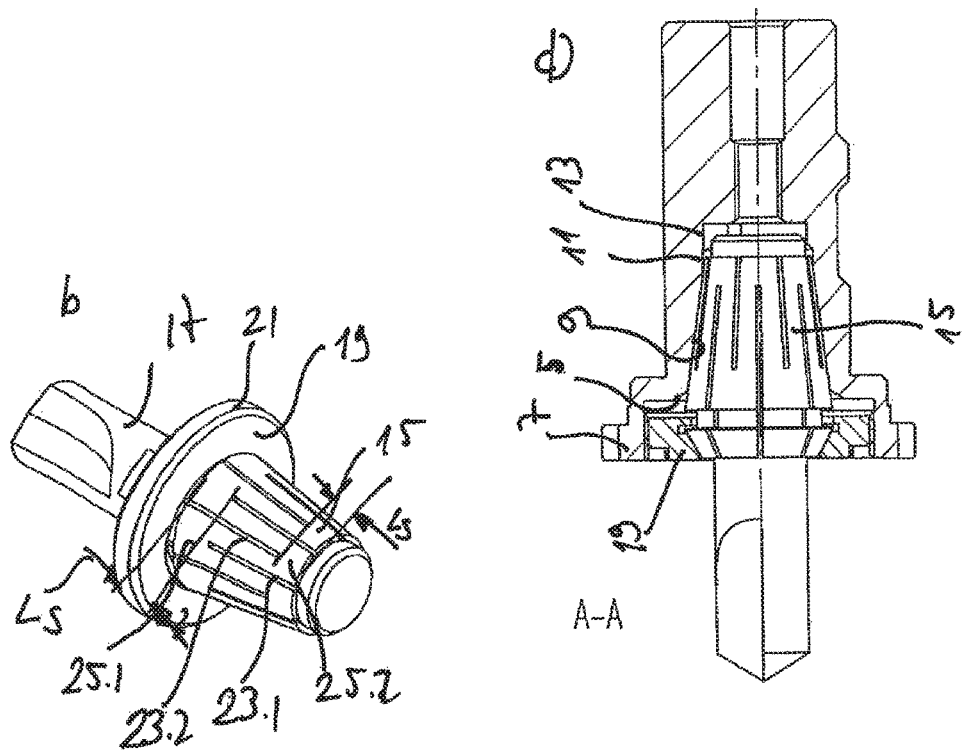

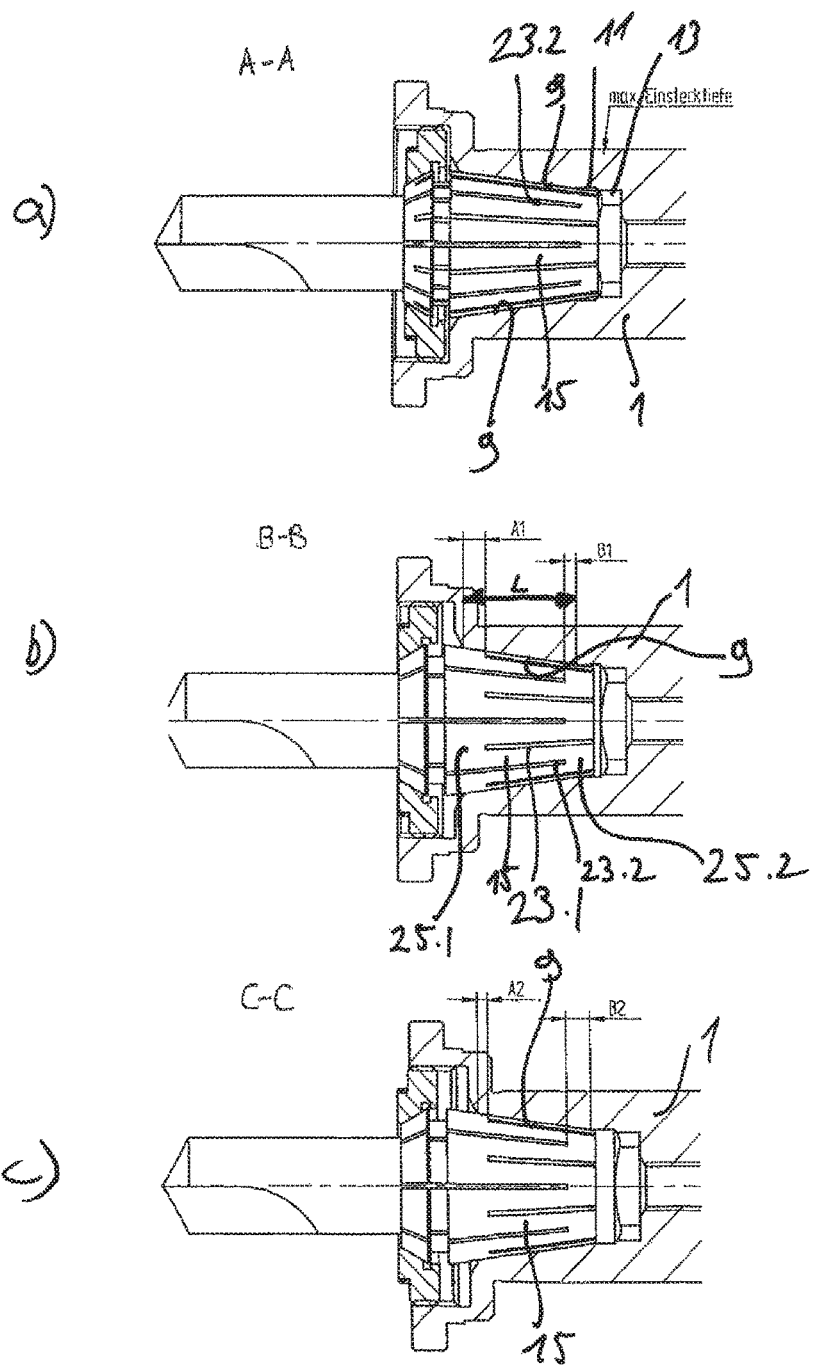

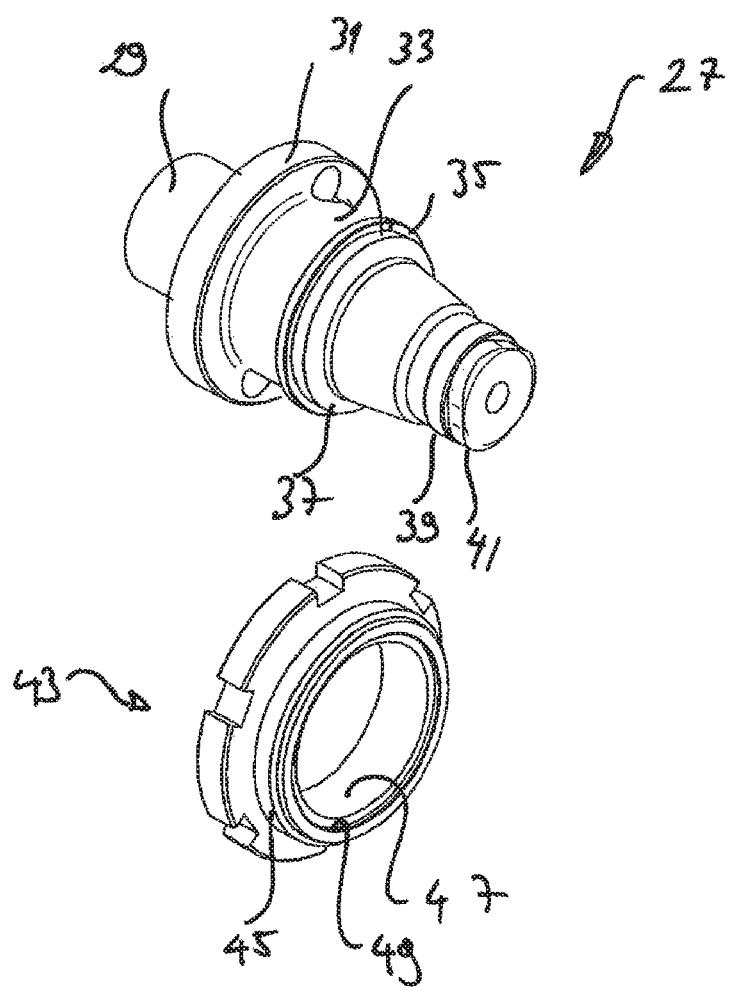

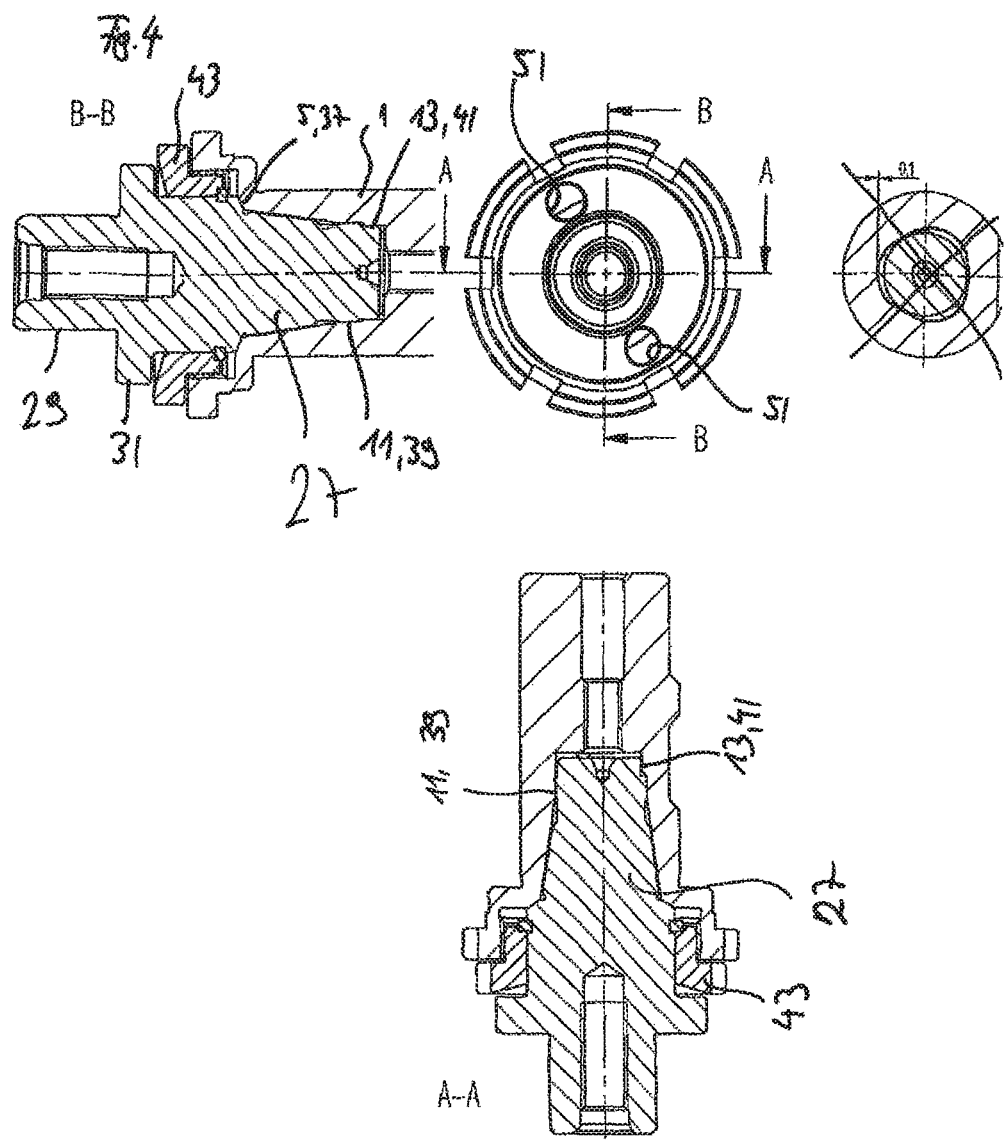

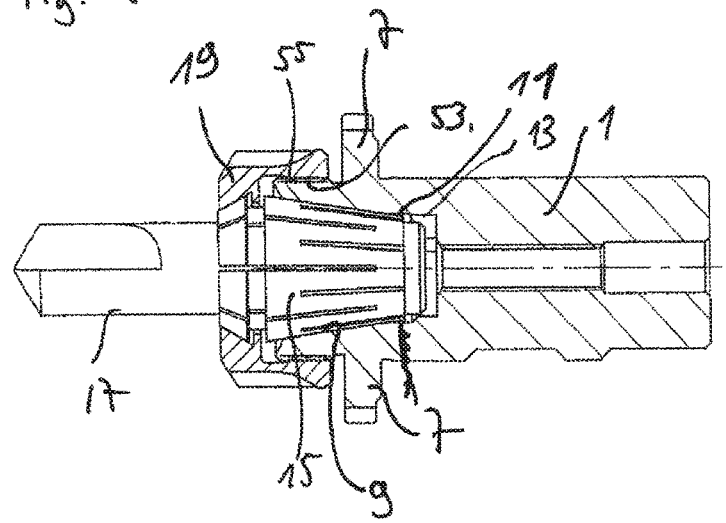
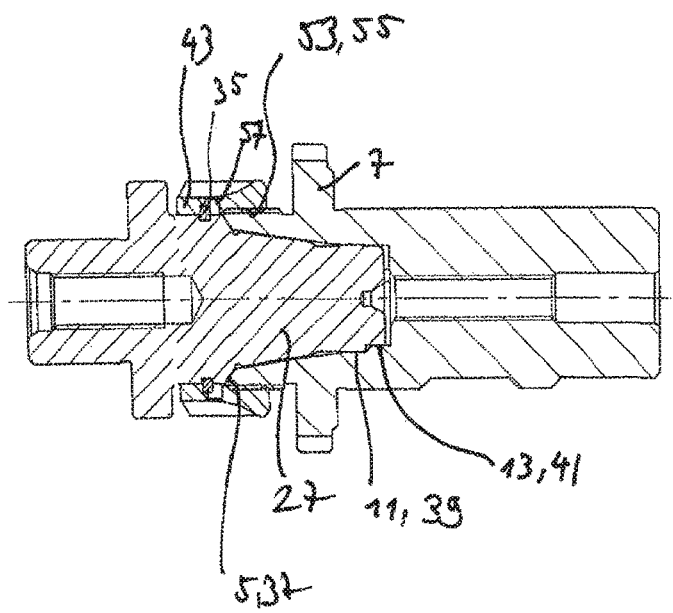

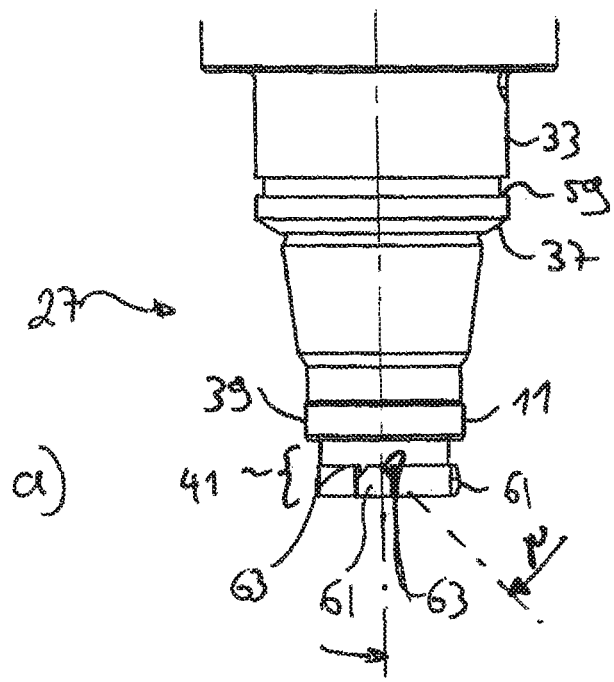
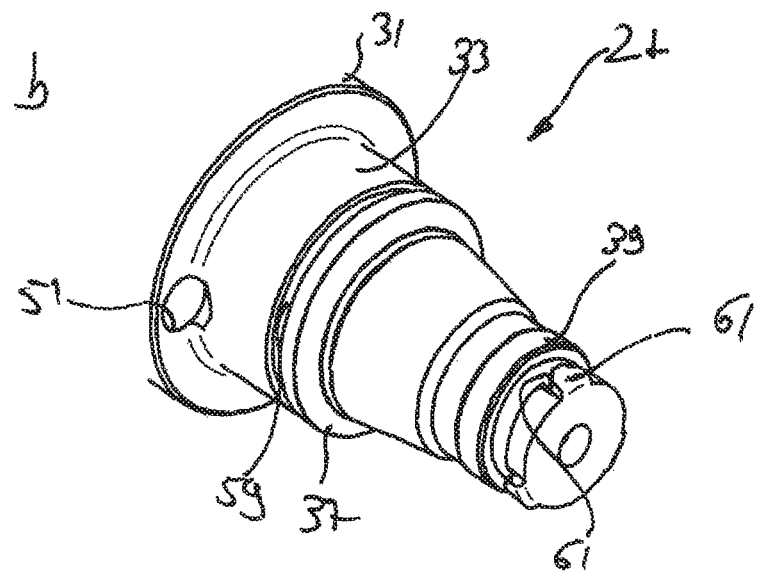

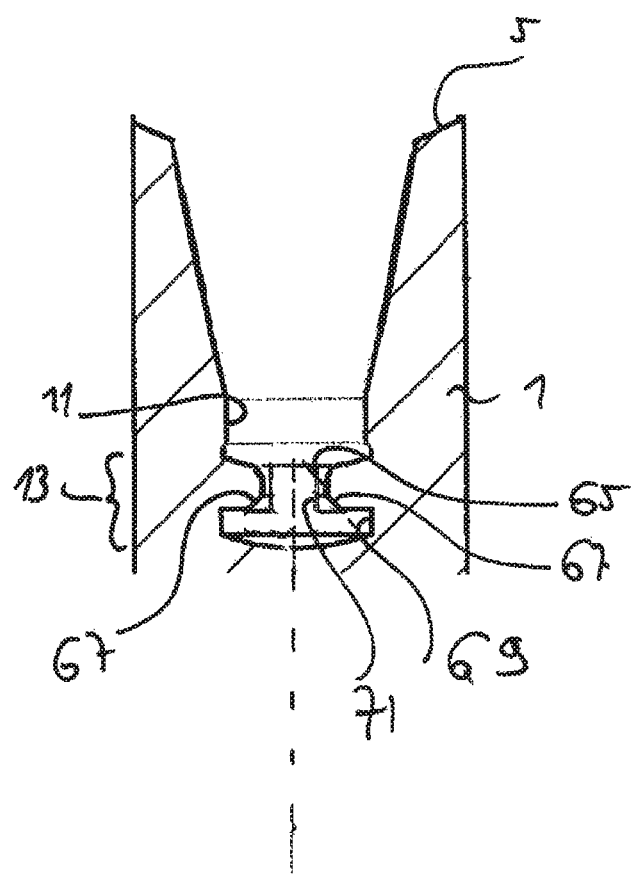

Fig. 9
a) 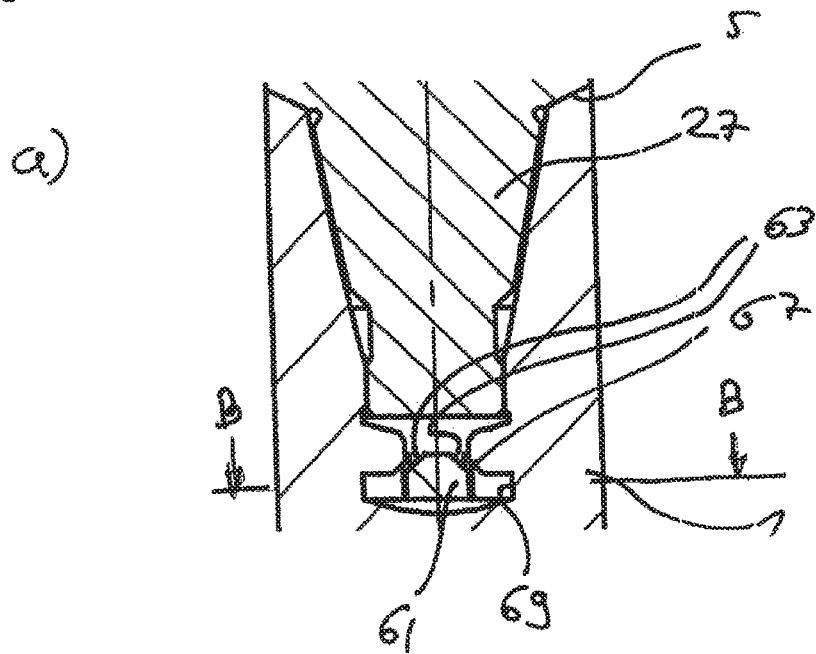
b) 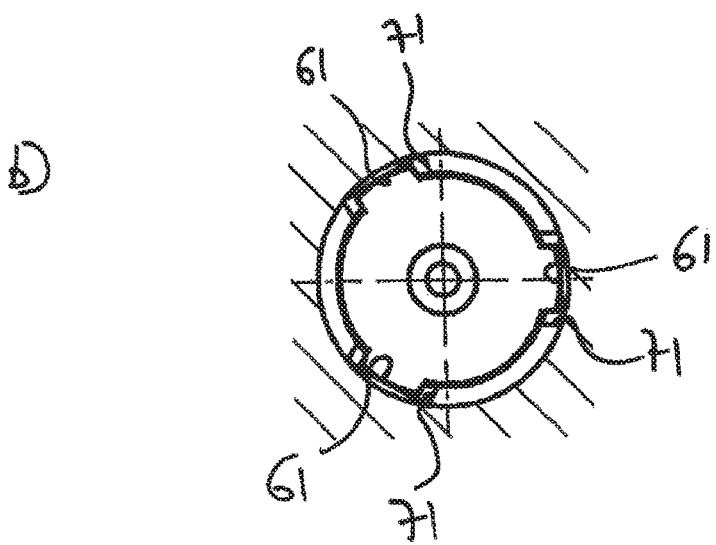

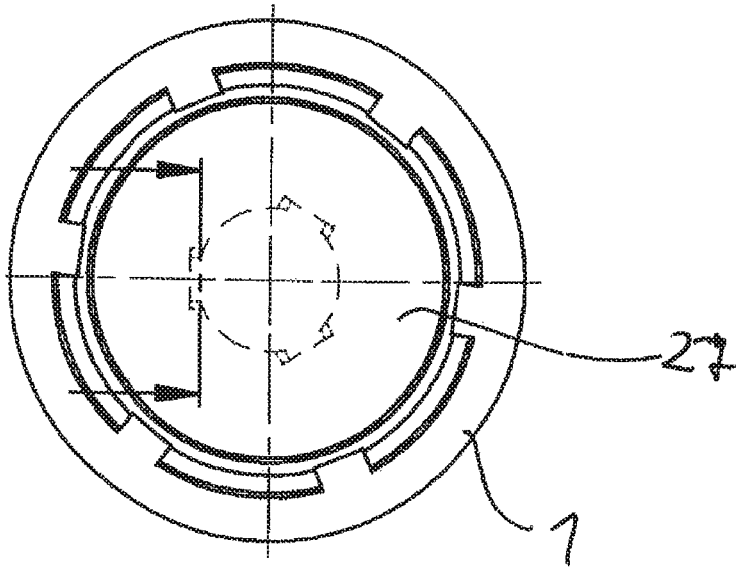
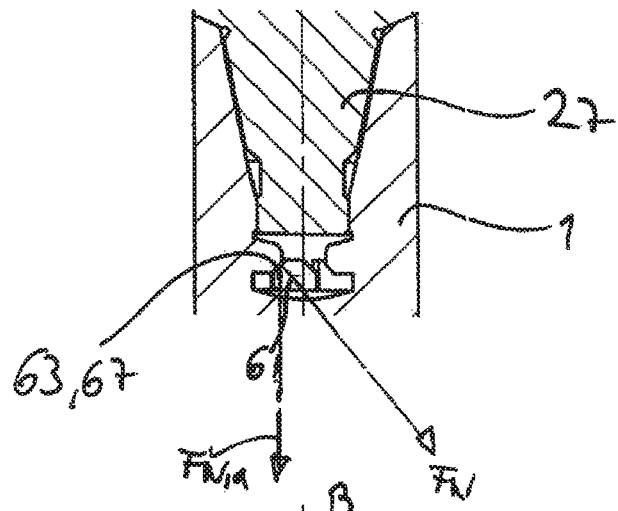
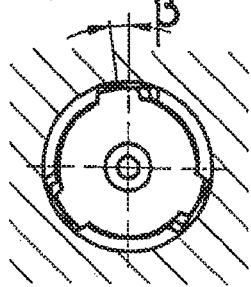
Fig. 10

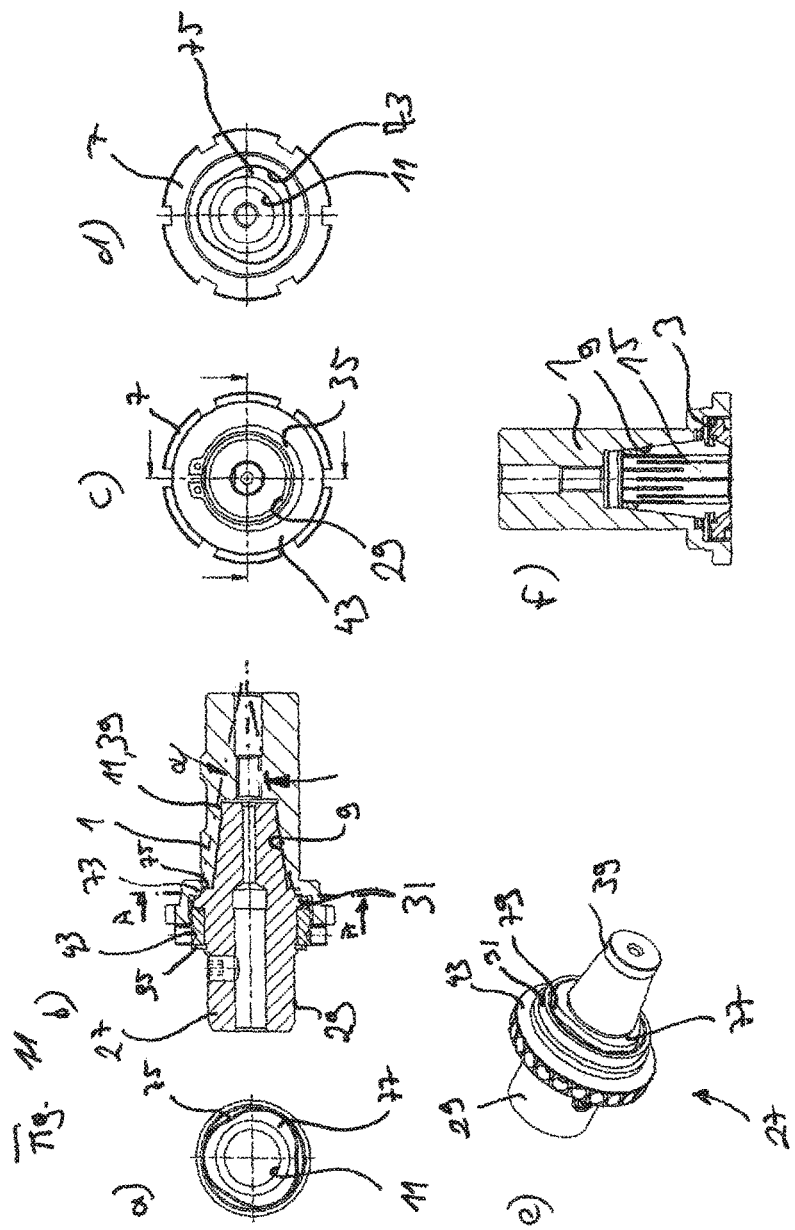

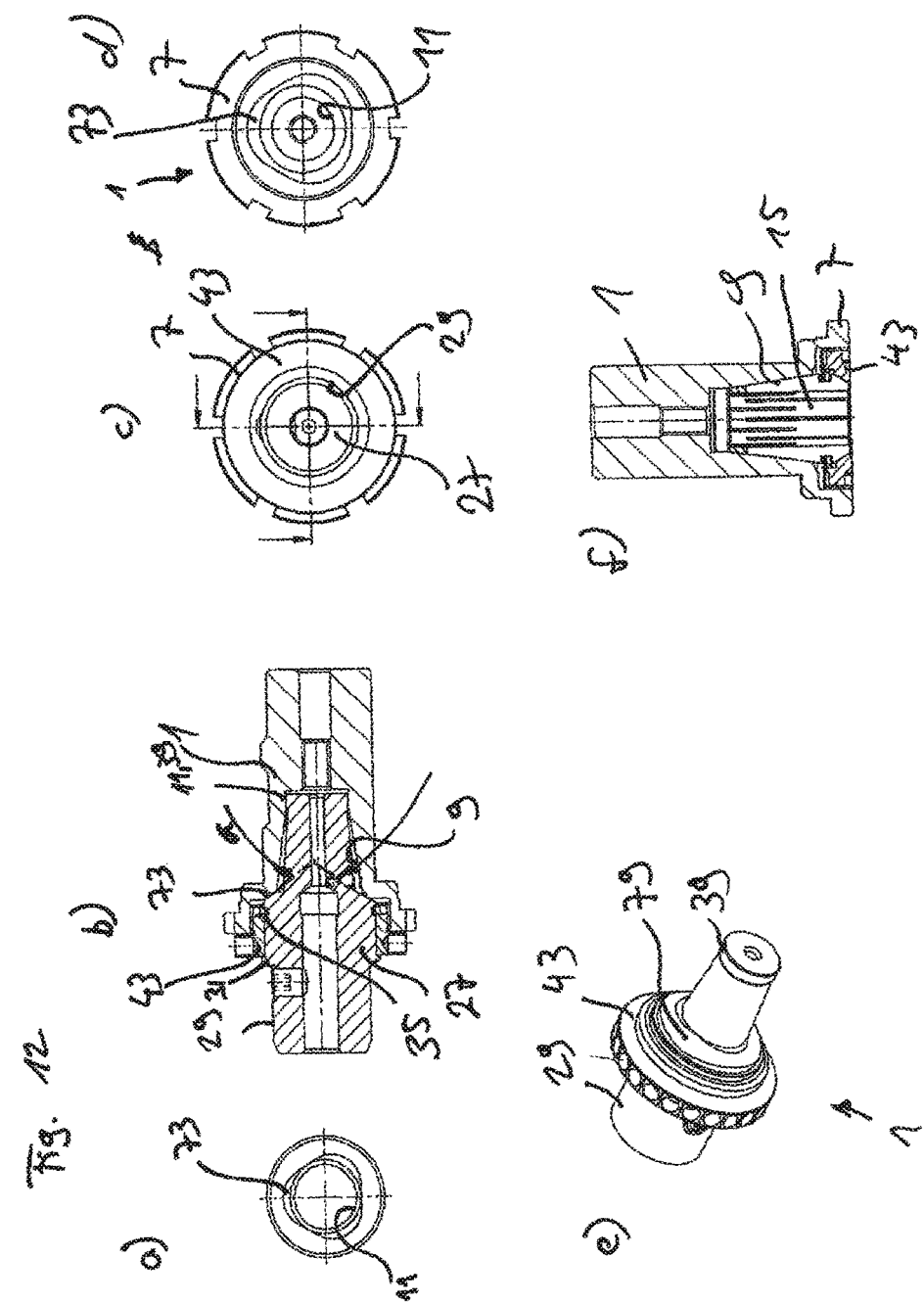

TOOL HOLDER HAVING A COLLET HOLDER AND A TOOL INSERT FOR USE IN A TOOL HOLDER

CROSS-REFERENCE TO RELATED APPLICATIONS

This application is a continuation of U.S. application Ser. No. 12/978,379, filed Dec. 23, 2010, and claims priority to DE 2009060678.5, filed Dec. 28, 2009, the entire contents of each of which are incorporated herein by reference.

DESCRIPTION

With the use of collets, rotating tools can be clamped in a very precise and compact manner. However, because not all tools can be clamped in one collet, the necessity arises of providing a tool holder in which both collets as well as tool inserts can be received for fixed or driven tools.

DE 102 19 600 C5 discloses a tool holder having a collet holder in which tool inserts can be used in addition to collets. In this context, the tool inserts have a flange plate. The tool insert is bolted to the tool holder via this flange plate. The tool insert is centered by the same conical borehole as the collets are.

Practice has demonstrated that the collet holder suffers wear from the multiple replacements of the collets. If the tool insert, such as is familiar from DE 102 19 600 C5, is received in the collet holder directly, then the wear on the collet holder increases. The resulting errors in geometry in the collet holder lead to significantly increased errors in the positioning and radial runout of the tool inserts that are inserted into the collet holder. The result is rapid wear on the cutting tools that are received in the tool inserts. When the cutting tools are used in machining, errors can arise in the geometry and surface of the work piece, and damage can occur to the surrounding components of the machine tool and to the tool holder due to the oscillations that can arise.

DISCLOSURE OF THE INVENTION

The invention is based on the objective of providing a tool holder that has a collet holder and that can also receive other tool inserts in addition to collets, whereby the replacement of a collet holder by a tool insert, and vice versa, can occur as rapidly as possible. Furthermore, both collets as well as tool inserts according to the invention are designed to be optimally received in the tool holder according to the invention with regard to radial and axial runout. In addition, during the machining process it is possible to transmit the highest torques from the tool holder to the collet or tool insert.

This objective is achieved according to the invention by a system that is made up of a tool holder in accordance with Claim 1 and a tool insert in accordance with Claim 16.

The system according to the invention is based on a tool holder having a collet holder, whereby the collet holder includes a conical borehole and a thread that is disposed coaxially with respect to the conical borehole and that cooperates with a clamping nut. The invention thus provides that means for centering a tool insert are configured in the axial direction between a first end of the conical borehole and the thread. As a result of the fact that the centering of the tool insert is accomplished independently of the conical borehole, the conical borehole functions only for clamping a collet, so that wear occurring in the collet holder has no effect on the tool insert.

The separate means according to the invention for centering a tool insert can be designed in accordance with the requirements of the tools that are received in the tool inserts. There are significant differences between the tools that are held in a collet and those that are held in a tool insert with respect to rotational speed, machining forces, and the drive torques that are required for the machining.

These differences can be reflected in the tool holder according to the invention in such a way that the precision, service life, and dependability of all components and therefore also the quality of the machined work pieces is significantly improved.

The conical borehole of the collet holder is not designed to be used for the radial and axial receiving of the tool insert, so that wear in the collet holder has no effect on the positional or runout precision of the tool insert. Due to the decoupling of the collet holder from the holder of the tool insert as provided by the invention, wear occurring in the collet holder no longer influences the tool insert, and the resulting errors described above can no longer occur.

The means for centering a tool insert can preferably be configured as a short taper, cylinder, and/or a polygon.

In accordance with the angle of taper that is selected for the short taper, the short taper can also improve the axial runout of the tool insert in addition to centering the tool insert. The basic principle is that the greater the angle of taper, the more the axial runout of the tool insert will be influenced and improved by the means for centering the tool insert. Through selecting the angle of taper, the designer can also take into account the constraints of every specific application case.

Because the invention provides that the collets and the tool insert are received in the tool holder with the use of various function surfaces, it is possible to optimally take into account the requirements in clamping a tool both using a collet as well as using a tool insert according to the invention.

In another advantageous embodiment of the tool holder, the short taper has an angle of taper of between 60° and 140°, preferably between 90° and 120°. This angular range has proved to be expedient for achieving, on the one hand, an excellent centering of a tool insert for insertion into the tool holder. At the same time, however, a very precise axial runout of the tool holder is also achieved. Through the selection of the angle of taper, the distribution of the axial clamping force can be adjusted for centering and for achieving a good axial runout. Practical experiments have shown that an angle of taper of between 90° and 120° is optimal. However, in the individual case both smaller and greater angle of tapers may be expedient.

In addition, according to the invention it is also possible to configure the centering means as a polygon connection. As a result, in addition to the centering it is also possible to transmit high torques, which is particularly advantageous if high cutting forces occur during the machining. If the molding element is designed as a conical polygon, then in addition to the radial and axial receiving of the tool holder, a form-locking fit in the rotational direction is also achieved without play.

It can be especially advantageous if, in contrast to the standard polygon connections, the polygon is designed not as a prismatic polygon connection, whose dimensions are constant in the direction of a rotational axis of the tool holder, but rather as a polygon connection that in the longitudinal cross section of the tool holder has a truncated conical shape. Then the means according to the invention for centering a tool insert can have three functions, namely centering the tool insert, assuring a good axial runout of the tool insert, and transmitting torque between the tool holder and the tool insert. The result is a very compact design. The weighting of these three functions can be adjusted during the design process by the shape of the polygon, as well as by the dimensions and selection of the angle of taper in accordance with the requirements of the individual case.

In addition, axial contact can be provided between the thread and the first end of the conical borehole. This is preferably the case if a small angle of taper has been selected, for example smaller than 30°, or if the means for centering the tool insert are cylindrical, because then the axial runout of the tool insert would not be sufficient without supplemental axial contact.

In an expanded design, the second end of the conical borehole is bounded by a cylindrical segment in the axial direction. This cylindrical segment along with the means for centering a tool insert assures that the radial and axial runout of the tool insert are improved. In particular, if the means for centering a tool insert are configured as a cylinder or as a short taper with a small angle of taper, then the cylindrical segment according to the invention is advantageous.

Both the collets as well as the tool insert according to the invention are advantageously clamped using the same thread of the tool holder, so that ease of servicing results and the installation space requirements of the tool holder are minimized. If two different clamping means are used to clamp the collet and the tool insert, this naturally leads to greater installation space requirements for the tool holder, and ease of operation declines.

An additional advantage of the joint use of the thread on the tool holder for clamping the collet as well as a tool insert can also be seen in the fact that operation is simple, and operating errors are virtually excluded.

Depending on the manufacturing and geometrical constraints and the angle of taper that is selected as a result, a second molding element in the form of a planar surface can be assigned both to the short taper as well as to the conical polygon. These combinations and their advantages are well known from the standards ISO 12164 (hollow shaft cone) and ISO 26623 (polygonal hollow shaft cone).

In angles of taper that are smaller than 90°, an additional planar surface is usually employed. In angles of taper that are greater than 90°, an additional planar surface can usually be omitted because the projected planar surface from the conical mold creates sufficient axial support and bending moment stiffness.

If the molding element is designed as a pure cylinder, then the first molding element takes on exclusively a radial reception. In order also to secure the axial reception of the tool insert within the tool holder, a planar surface must be added to the first molding element as a second molding element.

If both radial reception as well as torque transmission are to be achieved by the first molding element, then a polygon can also be used in place of the cylinder. As is the case with a cylinder, the pairing with a planar surface is then also necessary if the polygon is prismatic.

The thread of the tool holder can be designed as an internal or an external thread. Accordingly, the associated clamping nuts can be designed as having an external or internal thread. In many application cases, conventional clamping nuts can be used.

As is provided in another advantageous embodiment of the invention, if the thread is designed as an internal thread, and the centering means according to the invention and/or an axial contact are arranged between the short taper and the interior thread, then the internal thread has a greater diameter than conventional tool holders for clamping nuts. This results in the following advantages in the overall conception. First, as a result of the greater radial installation space, the planar surface, or the projected planar surface, of the short taper or of the conical polygon can be increased. In the tool inserts, this results in a substantially more stable support with respect to absorbing bending moment.

Second, the clamping nuts can be optimized with respect to stability and resistance to stress. As a result, greater clamping forces can be exerted by the clamping nuts on the collets, which results in greater efficiency of the tool holder according to the invention when collets are used. Of course, the same also applies if the tool holder according to the invention is combined with a tool insert according to the invention. Here too, an increased clamping force is advantageous in order to improve the efficiency of the system composed of tool holder and tool insert with regard to a high-performance tool that is attached to the tool insert.

An internal thread that is greater in diameter than conventional internal threads also has the advantage that the gripping surface for a key for activating the clamping nuts is increased, and therefore the application of clamping force by a tool is simplified and made more reliable. The contact surface for such a tool is often arranged on the front end of the clamping nuts, so that a wider annular front end of the clamping nuts has more installation space available in order to make an efficient and reliable transmission of torque possible between key and collet.

In another advantageous embodiment of the invention, one length of the conical borehole is so dimensioned that it permits the use of metal-seal collets. These metal-seal collets can be obtained on the market and are characterized in that the alternating slots in the collets have a somewhat reduced depth compared to conventional collets. As a result, between the end of one slot and the front end of the collet a sufficiently wide bar remains that makes it possible for the collet to reliably seal the conical borehole. As a result, it is possible in an internal coolant supply system to convey the coolant directly through the tool holder and the collet into the tool that is clamped in the collet, without having to use other sealing elements. At the same time, no coolant can splash in an uncontrolled manner into the vicinity of the tool holder or of the tool that is clamped therein.

In another advantageous embodiment of the invention, it is provided that a cylindrical segment and/or a carrier segment be configured on the second end of the conical borehole.

Whether the cylindrical segment is arranged directly on the second end of the conical borehole, followed by the carrier segment, or vice versa, has no significance for the overall functioning. The sequence of these segments is essentially a function of the geometric shape of the carrier segment and of the manufacturing technology that is available. Of course, the sequence of first carrier segment and then cylindrical segment is advantageous based on the somewhat greater support effect, but the difference compared with the reverse design is very small.

As a result of the cylindrical segment, additional improvement in the reception of a tool insert according to the invention is assured with respect to radial and axial runout. For the cylindrical segment receives a pin of a tool insert according to the invention. As a result, the "rear" end of the tool insert is radially fixed within the cylindrical segment, which has a positive influence on the bending stiffness of the connection between the tool insert and the tool holder and consequently on the radial and axial runout of a tool insert according to the invention that has been inserted into the tool holder.

In addition to the friction-locking connection between the tool insert and the short taper or the cylinder of the tool holder according to the invention, it is possible through the carrier segment also to achieve form-locking torque transmission, so that even at the highest cutting performances a "slipping" of the tool insert within the tool holder according to the invention is reliably prevented.

In a first embodiment of a carrier segment according to the invention, the segment has at least two, but preferably three or more, axial grooves. These axial grooves to a certain extent are a first part of a splined shaft connection, whereas the other part of the splined shaft connection is formed by corresponding lugs on the tool insert. In this design, the contact surfaces are designed to be parallel to the insertion direction of the tool insert.

In a further advantageous embodiment of the invention, the contact surfaces are shaped in such a way that they no longer run parallel to the insertion direction of the tool insert, but rather a tapering effect is achieved by means of a kind of wedge action. In connection with correspondingly arranged contact surfaces of the lugs on the tool insert, an improved axial clamping of the tool insert is achieved as a function of the torque. This has the effect that any vibrations arising between the tool holder and the tool insert are effectively damped and are even completely suppressed.

This increases even more the efficiency of a tool that is clamped in the system according to the invention made up of tool holder and tool insert. At the same time, the surface quality of the machined work pieces improves, and the wear on the tool is reduced.

Alternatively, it is also possible for the carrier segment to be configured as a polygon profile. Then a conventional polygon connection between the tool insert and the tool holder for purposes of transmitting torque can be achieved with all the advantages of this widely known connection. Through the controlled shaping of the contact surfaces on the polygon, the aforementioned reinforcement of the axial clamping is achieved here as well. The fine design of the contact surfaces can preferably be executed as a wedge-shaped or a screw-shaped thread. Both fine designs ultimately achieve the result that the tool insert is pulled into the tool holder as a result of the torques.

The aforementioned objective for receiving a tool insert in a tool holder in accordance with one of the preceding claims is achieved in that the tool insert has a counterpart surface that cooperates with the means for centering a tool insert that are configured on the tool holder.

This counterpart surface may be configured as a pin or as an external cone having a circular cross section or having a polygonal cross section.

If necessary, an axial contact can be provided that cooperates with the planar contact surface of the tool holder.

By using this tool insert according to the invention, both the centering of the tool insert within the tool holder as well as a good axial runout of the tool insert are achieved. At the same time, the transmission of torque, as required for the machining process, between tool holder and tool insert is assured independently of the conical borehole. Consequently, the aforementioned function elements, namely the pin and/or if necessary the carrier, can be optimally constructed and designed in accordance with the requirements so that when a tool insert according to the invention is used in the tool holder, a high cutting performance can be realized that produces high-quality surfaces on the machined work pieces.

To assure that the tool insert is connected to the tool holder according to the invention and is fixed and positioned there using only the means for centering a tool insert, the axial contact, the pin, and/or the carrier, the area of the tool insert between the external cone and the pin and/or the carrier is configured in such a way that the tool insert when installed does not contact the conical borehole of the tool holder. This can be achieved for example by the tool insert having a conical contour in this area, although in the installed state a play of at least $\frac{1}{10}$ mm occurs between the conical borehole and the tool insert. This play can be demonstrated simply by applying touch-up paint. Of course, it is also possible to achieve significantly greater distance between the conical borehole and the tool insert in the installed state. For example, the tool insert can be configured as a cylinder in the area between the pin according to the invention and the external cone according to the invention. In this case, the tool insert would become significantly lighter, which can be advantageous at the highest rotational speeds and the highest cutting performances.

In tool holders for machining that involves light cutting, there is no need for the additional support of the cylindrical segment.

In order to be able to attach the tool insert according to the invention in a tool holder according to the invention, means are provided for attaching the tool insert, said means being preferably configured as clamping nuts having an external or internal thread, and the clamping nut being rotatably supported on the tool. In this context, it is important to assure that the mount of the clamping nut on the tool insert is able to transmit the axial forces that are required to attach the tool insert within the tool holder. For example, this mount can be created by the clamping nut having a central interior borehole, which along with a correspondingly dimensioned cylindrical segment of the tool insert creates the mount of the clamping nut on the tool insert.

The axial forces between the clamping nut and the tool insert can then be transmitted by means of a ring, which can be configured, for example, as a wire ring or as a ring having a rectangular cross-section (a Seeger ring or the like).

For this purpose, a groove which partially accommodates the ring is introduced preferably within the cylindrical support surface of the tool insert. Within the interior borehole of the clamping nut a corresponding shoulder is hollowed out, which receives the part of the ring that radially extends to the outside over the tool insert. As a result, the axial forces that arise during the tightening of the clamping nut are transmitted to the tool insert, and the tool insert on its counterpart surface is therefore received and positioned within the tool holder in the means for centering a tool insert so that the tool insert according to the invention has a very good radial and axial runout.

In addition, a friction-locking and/or form-locking transmission of torque between the tool insert and the tool holder is also possible. Due to the relatively large diameter of the counterpart surface necessitated by the design, large torques can be reliably transmitted without the tool insert slipping within the tool holder.

In one inventive configuration of the tool insert, the carrier has a least two lugs, which along with the carrier segment of the tool holder in accordance with Claims 11 to 15 create a form-locking and rotationally fixed connection.

In another advantageous embodiment of the invention, the lugs of the carrier have contact surfaces that are at an angle >5° with respect to a longitudinal axis of the tool insert. As a result, it is possible that along with the form-locking transmission of torques between the tool holder and the tool insert, additional axial force components act on the lugs of the carrier, so that especially when large torques are being transmitted, in addition to the clamping force of the clamping nut, the tool insert is pulled into the centering means with a clamping force from the carrier. In addition, the diagonal contact surfaces also assure that any relative motions that might arise between the carrier and the area of the carrier, or the carrier segment, are damped. As a result, the maximum cutting capacity is increased even more, and the surface quality of the machined work pieces is even more improved.

Alternatively, it is also possible for the carrier to have a polygonal cross section, and for a carrier along with the carrier segment of the tool holder in accordance with Claim 14 to create a form-locking and rotationally fixed polygon connection. Thus the advantages of a polygon connection for transmitting torque, which are known from various other applications, can also be exploited in the system according to the invention made up of a tool holder and a tool insert. In addition, the contact surfaces of the polygon can generate additional longitudinal forces if their shape is adjusted. The shape in this context can utilize a wedge effect or a screw effect to generate the longitudinal forces.

In order to be able to use tools that have an internal coolant, the tool insert is hollow in one additional advantageous embodiment. This borehole mainly facilitates supplying the coolant from the tool holder to the tool.

Additional advantages and advantageous embodiments of the invention can be derived from the following drawing, description, and patent claims. All features disclosed in the drawing, description, and patent claims may be essential to the invention both individually as well as in any combination.

DRAWING

FIGS. 1 to 12 depict various views and representations of the exemplary embodiments of the tool inserts and tool holder according to the invention.

DESCRIPTION OF THE EXEMPLARY EMBODIMENTS

FIG. 1a depicts an exemplary embodiment of a tool holder 1 according to the invention in a longitudinal cross section. Tool holder 1 is rotatably supported, whereby the mounting of tool holder 1 in a machine tool is not depicted in FIG. 1.

Tool holder 1 has the function of receiving a collet or a tool insert according to the invention in accordance with requirements. In this context, it must be assured that both a tool that is clamped in a collet as well as a tool that is clamped in a tool insert are very precisely positioned with respect to radial and axial runout. In addition, of course, the torque required for cutting must be reliably transmitted from the tool holder to an undepicted tool insert, or to a collet that is also not depicted in FIG. 1a.

For this purpose, an internal thread 3, a short taper 5, a band 7, a conical borehole 9, a cylindrical segment 11, and a carrier segment 13 are configured within tool holder 1.

Internal thread 3 receives an undepicted clamping nut. Conical borehole 9 receives an undepicted collet and, in a generally familiar manner, clamps and guides the tool that is received in the collet.

If, as an alternative to the collet, a tool insert according to the invention (undepicted) is to be received in the tool holder according to the invention, then this occurs in this exemplary embodiment through the use of a short taper 5, which is configured between a first end of conical bore 9 and internal thread 3.

Short taper 5 centers the (undepicted) tool insert and ensures a good radial runout of same. Short taper 5 is a first exemplary embodiment of a means according to the invention for centering a tool insert.

Through an appropriate selection of the angle of taper of short taper 5, short taper 5 also achieves a good axial runout of the tool insert.

On a second end of conical borehole 9, a cylindrical segment 11 can be formed, which cooperates with a complementary pin of a tool insert and creates a further centering of the tool insert. Due to distance L between short taper 5 and cylindrical segment 11, as a result of the centering of undepicted tool insert on cylindrical segment 11, the axial runout of the tool insert is also improved in the area of short taper 5.

A carrier segment 13 is then optionally arranged on cylindrical segment 11, which makes it possible to achieve a form-locking transmission of torque between tool holder 1 and an undepicted tool insert according to the invention. In this context, carrier segment 13 can have, for example, a polygonal cross section, which along with a correspondingly shaped polygonal carrier of the (undepicted) tool insert contributes in a form-locking manner to the transmission of torque. Alternative embodiments of carrier segment 13 are explained in greater detail below.

At the point where internal thread 3 is arranged, tool holder 1 has a band 7, which has multiple recesses, as can be seen from FIG. 1c. The recesses make it possible to engage an (undepicted) hook wrench in order to arrest tool holder 1 in the rotational direction.

Alternatively, it is also possible, in place of internal thread 3, to create an external thread on an external diameter of tool holder 1. In this case, clamping nuts having an internal thread would be used. In the exemplary embodiment depicted in FIG. 1, the clamping nuts are provided with an external thread.

FIG. 1b in an isometric drawing depicts a conventional collet 15, which receives a tool 17 having a cylindrical shaft, and a clamping nut 19 having an external thread 21.

FIGS. 1c and 1d depict tool holder 1 in accordance with FIG. 1a having an inserted collet 15, tool 17, and clamping nut 19. FIG. 1c depicts a front view, whereas FIG. 1d depicts a section along the line A-A in FIG. 1c.

As can be seen from FIG. 1d, collet 15 is clamped within tool holder 1 only in the area of the conical borehole. Short taper 5, cylindrical segment 11, and carrier segment 13 have no contact with collet 15. From the drawing according to FIG. 1d, it is also clear that clamping nut 19 having an external thread is designed as a conventional clamping nut such as is known from the prior art. The same applies to collet 15. This is one essential advantage of the tool holder according to the invention, since conventional collets and clamping nuts 19 can be used. Therefore, conical borehole 9 is preferably shaped in accordance with the relevant standards.

In many cases, it can be advantageous in determining the diameter of internal thread 3 within tool holder 1 to deviate from customary industry standards and to enlarge the diameter of internal thread 3. As a result, the maximum clamping force can be increased and more space be made available on the end face of clamping nut 19 for applying a hook wrench (undepicted). Consequently, the danger decreases of an accident occurring due to the hook wrench sliding. In addition, larger torques may be exerted on the clamping nut, which is positively reflected in greater axial clamping forces.

As can be seen from the view in FIG. 1b) slots 23.1 and 23.2 in collet 15 do not extend to the end of the collet, but rather they terminate before that. As a result, bars 25.1 and 25.2 remain, which ensure that clamping nut 19 does not disintegrate into individual parts, and they also together with conical borehole 9 create a metal seal. The width of bars 25.1 and 25.2 is designated in FIG. 1b as $L_s$, and they are designed so as not to measure less than a specific lower limit, because otherwise the metal seal would not be assured.

Because collets 15 generally have a clamping range of 1 mm, this also has the result that, depending on the diameter of the tool shaft, collet 15 is pressed more or less deeply into conical borehole 9 of the tool holder, when clamping nut 19 is tightened.

FIG. 2 depicts various installation situations of collets 15. FIG. 2a depicts a conventional collet 15, where the shaft diameter of tool 17 is minimal. Consequently, collet 15 is pressed very deeply into conical borehole 9 when clamping nut 19 is tightened. In the case of the collet according to FIG. 2a, because slots 23.2 are very long, these slots protrude into the cylindrical segment 11 of tool holder 1. Therefore, a metal seal between conical borehole 9 and collet 15 is no longer provided.

The drawings according to FIGS. 2b and 2c depict so-called metal-seal collets 15. The essential difference with regard to conventional collets lies in the width of bars 25.1 and 25.2.

Metal-seal collets 15, as they are known from the prior art, can also be used in tool holder 1 according to the invention. In this regard, it should be noted that length L of conical borehole 9, which is bordered on one end by short taper 5 and on the other end by cylindrical segment 11, is dimensioned so that, within the clamping range of collet 15, a sufficient overlap is provided between bars 25.1 and 25.2 and conical borehole 9.

FIG. 2b depicts a metal-seal collet 15 along with a tool having a minimal shaft diameter, in the clamped state. As a result, overlap B1 between bar 25.1 and conical borehole 9 is minimal, and overlap A1 between conical borehole 9 and bar 25.1 is at a maximum in FIG. 2b.

If collet 15 along with tool 17 having a maximum shaft diameter is clamped within tool holder 1, then the situation reverses itself. In this case, the overlap between bar 25.2 and the conical borehole is at a maximum (see B2 and FIG. 2c), whereas the overlap between bar 25.1 and conical borehole 9 is at a minimum (see A2 in FIG. 2c).

Measurements B1 and A2 are influenced by length L of conical borehole 9. However, by making the length of slots 23 within collet 15 congruent with length L of conical borehole in tool holder 1 according to the invention, it can be assured that collets 15 are positioned in conical borehole 9 so as to provide a metal seal at every shaft diameter of tool 17 that lies within the clamping range of collet 15.

For reasons of clarity, in FIGS. 2a to c, not all components are furnished with reference numerals. However, all assertions with respect to FIG. 1 apply accordingly.

FIG. 3 depicts an exemplary embodiment of a tool insert 27 according to the invention and an associated clamping nut 19, which are depicted more or less in an exploded representation. Tool insert 27 has a pin 29 on which, for example, a cylindrical cutter or a face cutter (undepicted) can be mounted. However, the invention is not limited to this type of tool reception. At the left end of tool insert 27 in FIG. 3, every type of tool attachment it possible both for rotating as well as for fixed tools.

Tool insert 27 depicted in FIG. 3 includes a flange 31, a cylindrical contact surface 33, a safety ring 35, an external cone 37, a pin 39, and a carrier 41.

Clamping nut 43, depicted in FIG. 3 below tool insert 27, has an external thread 45 and a coaxial borehole 47. On the right end of borehole 47 in FIG. 3, a recess 49 is hollowed out, which receives a part of slotted ring 35 that radially extends to the outside over cylindrical contact surface 33 of tool insert 27, when clamping nut 43 having borehole 47 is slid onto cylindrical contact surface 33 of tool insert 27.

On the left end of clamping nut 43 in FIG. 3, grooves are configured (without reference numerals) on the periphery, which aid in engaging a hook wrench (undepicted).

Clamping nut 43 is mounted on tool insert 27 by removing safety ring 35 and sliding clamping nut 43 onto cylindrical contact surface 33. Cylindrical contact surface 33 along with borehole 47 of clamping nut 43 forms a rotatable mounting for clamping nut 43. Then slotted ring 35 is again introduced into a groove (see reference numeral 59 in FIG. 7) of the tool insert, and the part of ring 35 still protruding radially to the outside over cylindrical contact surface 33 fits into recess 49. In this way, it is possible to transmit axial forces from clamping nut 43 to tool insert 27 and also to enable the rotation of clamping nut 43 relative to tool insert 27 when the tool insert is clamped.

Pin 39 is so dimensioned that it forms a narrow clearance fit with cylindrical segment 11 of tool holder 1, thus radially securing tool insert 27. Due to the axial distance between the pin and external cone 37, the axial runout of flange 31, and on pin 29 of the tool insert, is also improved.

On the right end of tool insert 27 in FIG. 3, a polygonal carrier is configured, which together with carrier segment 13 of the tool holder makes possible a form-locking connection and the transmission of torque between tool holder 1 and tool insert 27.

FIG. 4 depicts a tool holder 1 having an inserted tool insert 27 in the clamped state. These various views illustrate the mounting of clamping nut 43 on cylindrical contact surface 33 of the tool insert and the mounting of slotted ring 35, on the one hand, in a circumferential groove of tool insert 27 and, on the other hand, in recess 49 of the clamping nut. The recess assures that slotted ring 35 cannot be radially pressed out of the groove in tool insert 27 even in response to the greatest axial forces.

FIG. 4 also demonstrates clearly that the contact between tool insert 27 and tool holder 1 is limited to short taper 5, or exterior cone 37, cylindrical segment 11, and pin 39, as well as carrier segment 13 and carrier 41. In the area of conical borehole 9, there is no contact between tool insert 27 and tool holder 1.

To remove tool insert 27 from tool holder 1, clamping nut 43 is rotated counterclockwise. Consequently, clamping nut 43 is pressed against flange 31 of tool insert 27. Due to the large angle of taper of roughly 90-120° on short taper 5 and due to the clearance fit, in this exemplary embodiment, tool insert 27 within tool holder 1 is not clamped between cylindrical segment 11 of tool holder 1 and pin 29.

Boreholes 51 (see FIG. 4) receive carrier pins, which in turn carry the cutting tool during the rotational motion.

From the cutaway view along line A-A it is clear that cylindrical segment 11 is somewhat greater in diameter than carrier segment 13, so that tool insert 27 is easy to install.

FIGS. 5 and 6 depict an exemplary embodiment of a tool holder 1 according to the invention and of a tool insert 27 according to the invention, in which an external thread 53 is arranged on tool holder 1 and therefore the clamping nut, or clamping nut 43, of tool insert 27 has an internal thread 55.

Conical borehole 9, cylindrical segment 11, and carrier segment 13 of tool holder 1 are identical in this exemplary embodiment to those in the first exemplary embodiment discussed on the basis of FIGS. 1-4.

FIG. 6 depicts the second exemplary embodiment of a tool holder 1 according to the invention and a tool insert 27 having a clamping nut 43 which has an internal thread 55, also shown in longitudinal cutaway view. In this context, between borehole 47 and internal thread 55, there is not only recess 49 for slotted ring 35, but also an annular pocket 57, which assures that ring 35 is easy to mount. Wire ring 35 is arranged within this pocket 57 when clamping nut 43 is slid onto cylindrical contact surface 33.

FIGS. 7 to 10 depict an exemplary embodiment of a carrier segment 13 and a carrier 41 in various views. The essential difference with respect to the other exemplary embodiments can be seen in the shape of carrier segment 13 and carrier 41. A tool insert 27 is depicted in FIG. 7a. In this view, a circumferential groove 59 can be clearly seen that is cut into cylindrical contact surface 33 and that facilitates the reception of slotted ring 35.

A total of three lugs 61 are configured on carrier segment 13. On the upper side of lugs 61 facing cylindrical segment 11, two contact surfaces 63 are formed, which roughly form an angle of 5-45° to a longitudinal axis (without reference numeral) of tool insert 27. FIG. 7b depicts an isometric drawing of tool insert 27 in accordance with FIG. 7a.

FIG. 8 depicts a carrier segment 13 of tool holder 1 that is compatible with the above. Carrier segment 13 of tool holder 1 has a neck 65. A chamfer 67 and a diameter enlargement 69 are created in the axial direction beneath neck 65.

Within neck 65 and chamfer 67, there are multiple axial grooves 71, of which only one is visible in FIG. 8. Axial grooves 71 corresponding in number and dimensions to lugs 61 of tool insert 27 in accordance with FIG. 7, so that tool insert 27 can be inserted from above into tool holder 1 and in the process lugs 61 can be introduced through axial grooves 71 into diameter enlargements 69.

FIG. 9 depicts the exemplary embodiment according to FIG. 8 showing an inserted tool insert 27 according to FIG. 7 in a cutaway view. It makes clear that lugs 61 of tool insert 27 are located within axial grooves 71, and contact surfaces 63 of the lugs are located roughly at the level of chamfer 67. A cutaway view along the line B-B in accordance with FIG. 9a makes clear that in the rotational direction there is play between axial grooves 71 and lugs 61. It is also possible for tool insert 37 to rotate somewhat relative to tool holder 1 before it arrives in its form-locking state. Then contact surfaces 63 make contact with chamfer 67 of tool holder 1 and assure the form-locking transmission of torque between tool holder 1 and tool insert 27.

This situation is depicted in FIG. 10. FIG. 10a depicts a top view of tool holder 1 with inserted tool insert 27, and in this top view the sectional plane in accordance with FIGS. 10b and 9a is depicted. Tool insert 27 is rotated relative to FIG. 9a about an angle β with respect to tool holder 1. In this case, left contact surface 63 of lug 61 makes contact on chamfer 67 of tool holder 1 and supports the transmission of torque through the form-locking connection between tool holder 1 and tool insert 27.

Because contact surface 63 is not arranged parallel to the longitudinal axis, i.e. to the rotational axis of tool holder 1, but rather for the sake of clarity forms an angle of roughly 5-45° with the rotational axis of tool holder 1, normal force $F_N$ acting upon contact surface 63 has a component in the circumferential direction that facilitates the transmission of torque and a component in axial direction $F_{N,a}$ that pulls tool insert 27 in the axial direction against short taper 5 of tool holder 1. As a result, the fixing in position of tool insert 27 is improved, and any vibrations or oscillations that may arise between tool holder 1 and tool insert 27 are effectively damped. Because lugs 61 have diagonal contact surfaces 63 on both sides, this effect is achieved regardless of the rotational direction of tool holder 1.

Therefore it is also possible to place full stress on tool holder 1 according to the invention having a tool insert according to the invention in both clockwise and counterclockwise directions, because there is no danger of clamping nut 43 loosening in response to counterclockwise motion and thus tool insert 27 being no longer held within tool holder 1.

In the exemplary embodiment depicted in FIG. 11, clamping nut 43 is slid onto tool insert 27 from the "tool side." From the longitudinal cutaway view in FIG. 11, it is clear that clamping nut 43 is arranged to the left of band 7. Consequently, slotted ring 35 in FIG. 11 is arranged to the left of clamping nut 43. This embodiment has the advantage that the clamping force is introduced directly from clamping nut 43 into flange 31 of tool insert 3.

In tool holder 1 depicted in FIG. 11, the means for centering tool insert 27 are configured as a conical polygon. The appropriate angle of taper α in this exemplary embodiment is relatively small being roughly 15°, so that conical polygon 73 mainly facilitates the centering of tool insert 27 and the transmitting of torque. The angle of taper α (see FIG. 11b) can lie within a range between 0° (=prismatic polygon) and roughly 90°.

Therefore, between conical polygon 73 and conical borehole 9, an axial contact 75 is formed, which cooperates with a corresponding planar surface 77 of tool holder 1. Therefore the required axial runout of tool insert 27 is assured.

FIG. 11a) depicts a cutaway view along the line A-A in FIG. 11b, from which axial contact 75 and conical polygon 73 can be clearly recognized.

FIG. 11d) depicts a view from the left of tool holder 1 without tool insert 27, from which axial contact 75 and conical polygon 73 can also be clearly recognized.

FIG. 11c) depicts a view from the left of tool holder 1 having tool insert 27, and FIG. 11e) depicts an isometric drawing of tool insert 27 in order to clarify the design of this exemplary embodiment of a tool insert 27 according to the invention. In this isometric drawing, counterpart surface 79 with respect to conical polygon 73 of the tool holder can be clearly recognized.

In this exemplary embodiment, only one cylindrical segment 11 is configured on the second end of conical borehole 9. A carrier segment is not required because conical polygon 73 takes over the transmission of torque.

FIG. 11f) depicts a longitudinal cutaway view of tool holder 1 having collet 15, from which it is clear that collet 15 and tool insert 27 employ identical internal thread 3, and collet 15 is positioned only by conical borehole 9.

The exemplary embodiment depicted in FIG. 12 substantially corresponds to the exemplary embodiment depicted in FIG. 11, so that only the differences are discussed below.

Clamping nut 43, as in the former exemplary embodiment, is slid from the machine side onto tool insert 27.

Angle of taper α is relatively large in this exemplary embodiment and is roughly 100°, so that conical polygon 73, in addition to centering tool insert 27 and transmitting the torque, also assures the axial runout of tool insert 27. Consequently, axial contact on tool holder 1 and a planar surface on tool insert 27 are not necessary.

It is also easy to see in FIG. 12*b*) that tool insert 27 makes no contact with conical borehole 9.

The invention claimed is:

1. A system comprising a tool holder having a collet holder, whereby the collet holder includes a conical borehole having a central axis and a thread that is arranged so as to be coaxial with respect to the central axis, whereby the thread cooperates with a first clamping nut when a collet is clamped to the collet holder and wherein the conical borehole is a centering means for the collet, and wherein the collet holder further includes a separate means to center a tool insert, the means to center a tool insert configured in an axial direction parallel to the central axis and positioned between a first end of the conical borehole proximate the thread in the axial direction and the thread, wherein the means to center a tool insert is configured as at least one selected from a group including a short taper, a cylinder, and a polygon, the system further comprising a tool insert, wherein the tool insert has a counterpart surface that directly, physically abuts the means for centering a tool insert, wherein the counterpart surface of the tool insert is configured as at least one selected from a group including an external cone, a cylinder, and as a polygon, wherein the tool insert includes a means for attaching the tool insert within the tool holder, wherein the means for attaching the tool insert with the tool holder is configured as a second clamping nut having an external thread or an internal thread configured to cooperate with the thread of the collet holder, such that both the first clamping nut and the second clamping nut are each separately configured to engage the thread of the collet holder, wherein the second clamping nut is configured to be rotatably supported on the tool insert, and is configured to transmit axial forces that are required to attach the tool insert within the tool holder.

2. The system as recited in claim 1, wherein the tool holder includes an axial contact surface arranged in the axial direction between the first end of the conical borehole and the thread of the collet holder, wherein the axial contact surface is separate from the conical borehole and is configured to directly, physically abut a corresponding contact surface of the tool insert to limit axial movement of the tool insert.

3. The system as recited in claim 1, wherein the conical borehole is bordered at a second end opposite the first end by at least one selected from a group including a cylindrical segment and a carrier segment.

4. The system as recited in claim 1, wherein the means to center a tool insert is a short taper, and wherein the short taper has an angle of taper between 0° and 140°.

5. The system as recited in claim 1, wherein the thread of the collet holder is configured as an external thread.

6. The system as recited in claim 1, wherein the thread of the collet holder is configured as an internal thread.

7. The system as recited in claim 1, wherein a length of the conical borehole is dimensioned so that it permits the use of metal-seal collets.

8. The system as recited in claim 1, wherein the conical borehole is bordered at a second end opposite the first end by a cylindrical segment and, connected thereto, a carrier segment, wherein the cylindrical segment and the carrier segment both extend coaxially about the central axis and are arranged on the second end of the conical borehole, and wherein the cylindrical segment is located between the carrier segment and the second end, wherein the carrier segment includes at least one of an axial groove or a polygonal shape, and wherein the carrier segment is configured to transmit torque from the tool holder to the tool insert.

9. The system as recited in claim 1, wherein the conical borehole is bordered at a second end opposite the first end by a carrier segment and, connected thereto, a cylindrical segment, wherein the carrier segment and the cylindrical segment both extend coaxially about the central axis and are arranged on the second end of the conical borehole, and wherein the carrier segment is located between the cylindrical segment and the second end, wherein the carrier segment includes at least one of an axial groove or a polygonal shape, and wherein the carrier segment is configured to transmit torque from the tool holder to the tool insert.

10. The system as recited in claim 1, wherein the conical borehole is bordered at a second end opposite the first end by a carrier segment.

11. The system as recited in claim 1, wherein the conical borehole is bordered at a second end opposite the first end by a cylindrical segment and a carrier segment.

12. The system as recited in claim 11, wherein the counterpart surface of the tool insert is configured as at least one selected from a group including an external cone, a cylinder, and as a polygon.

13. The system as recited in claim 11, wherein the tool insert includes at least one selected from a group including a pin that cooperates with the cylindrical segment and a carrier that cooperates with the carrier segment.

14. The system as recited in claim 11, wherein no part of the tool insert in the installed state makes contact with the conical borehole.

15. The system as recited in claim 11, wherein the tool insert includes a means for attaching the tool insert within the tool holder.

16. The system as recited in claim 11, wherein the tool insert is hollow.

17. The system as recited in claim 11, wherein the tool insert includes a carrier that cooperates with the carrier segment.

18. The system as recited in claim 17, wherein the carrier has at least two lugs, and the at least two lugs form a form-locking and rotationally fixed connection with the carrier segment.

19. The system as recited in claim 18, wherein the at least two lugs have at least one contact surface.

20. The system as recited in claim 17, wherein the carrier has a polygonal cross section, and the carrier forms a form-locking and rotationally fixed connection with the carrier segment.

21. The system as recited in claim 20, wherein a contact surface of the carrier is configured in a spiral shape or screw shape and is designed to complement at least one contact surface of the tool holder.

22. The system as recited in claim 17, wherein at least one contact surface of the carrier forms a contact angle with a longitudinal axis of the tool insert, and the contact angle lies in a range between 0° and 60°.

23. The system as recited in claim 17, wherein the carrier segment has at least one contact surface.

24. The system as recited in claim 17, wherein the carrier segment includes a neck, a diameter enlargement, and a contact surface that is configured as a chamfer, whereby the chamfer is arranged in the axial direction between the neck and the diameter enlargement.

25. The system as recited in claim 17, wherein the carrier segment has at least two axial grooves.

26. The system as recited in claim 17, wherein a cross section of the carrier segment corresponds to a polygon profile.

27. The system as recited in claim 26, wherein contact surfaces of the cross section of the carrier segment corresponding to the polygon profile are configured so as to be spiral-shaped or screw-shaped.

28. The system as recited in claim 1, wherein the first clamping nut is separate and different in shape from the second clamping nut.

* * * * *